United States Patent
Klemm et al.

(10) Patent No.: US 11,019,000 B2
(45) Date of Patent: May 25, 2021

(54) SYSTEM AND METHOD FOR EMAIL MANAGEMENT THROUGH DETECTION AND ANALYSIS OF DYNAMICALLY VARIABLE BEHAVIOR AND ACTIVITY PATTERNS

(71) Applicant: Avaya Inc., Santa Clara, CA (US)

(72) Inventors: Reinhard Klemm, Basking Ridge, NJ (US); Parameshwaran Krishnan, Basking Ridge, NJ (US); Navjot Singh, Somerset, NJ (US)

(73) Assignee: Avaya, Inc., Santa Clara, CA (US)

( * ) Notice: Subject to any disclaimer, the term of this patent is extended or adjusted under 35 U.S.C. 154(b) by 0 days.

(21) Appl. No.: 16/832,735

(22) Filed: Mar. 27, 2020

(65) Prior Publication Data

US 2020/0228471 A1 Jul. 16, 2020

Related U.S. Application Data

(63) Continuation of application No. 14/318,676, filed on Jun. 29, 2014, now abandoned.

(51) Int. Cl.
*H04L 12/58* (2006.01)
(52) U.S. Cl.
CPC .................................. *H04L 51/02* (2013.01)
(58) Field of Classification Search
CPC ........................................................ H04L 51/02
See application file for complete search history.

(56) References Cited

U.S. PATENT DOCUMENTS

| | | | | |
|---|---|---|---|---|
| 9,871,751 B2* | 1/2018 | Beausoleil | ............ | H04L 51/14 |
| 9,967,219 B2* | 5/2018 | Mankovskii | ............ | H04L 67/22 |
| 10,223,369 B2* | 3/2019 | Roseman | ............... | G06Q 20/36 |
| 10,673,797 B2* | 6/2020 | Osipkov | ................. | H04L 51/22 |
| 2011/0289162 A1* | 11/2011 | Furlong | ................. | H04L 51/12 |
| | | | | 709/206 |
| 2015/0089007 A1* | 3/2015 | Amoroso | ............. | G06Q 10/107 |
| | | | | 709/206 |
| 2016/0320926 A1* | 11/2016 | Ganin | ..................... | H04L 51/36 |

* cited by examiner

*Primary Examiner* — Daniel C. Murray

(57) ABSTRACT

Techniques for aiding an email recipient in the management of inbound email by detecting, and configurably responding to, dynamically variable patterns of activity and behavior are described. Characteristics are extracted from new email messages originated by senders and intended for a recipient. One or more patterns of sender activity, recipient message management behavior, and/or message response behavior, relating to treatment of messages from individual senders and/or plural senders in the aggregate, are identified. The patterns are identified by analyzing statistics collected by the extraction of characteristics from email messages previously received by the recipient. Before the recipient reads a new email, a determination is made as to whether any deviation from an identified pattern exists; and, if so, a pre-existing rule for treatment of the new message is enforced and/or a new rule specifying treatment of at least some messages from the sender of the email is proposed.

20 Claims, 15 Drawing Sheets

SYSTEM AND METHOD FOR EMAIL MANAGEMENT THROUGH DETECTION AND ANALYSIS OF DYNAMICALLY VARIABLE BEHAVIOR AND ACTIVITY PATTERNS

RELATED APPLICATIONS

This application is a continuation of U.S. patent application Ser. No. 14/318,676, entitled "SYSTEM AND METHOD FOR EMAIL MANAGEMENT THROUGH DETECTION AND ANALYSIS OF DYNAMICALLY VARIABLE BEHAVIOR AND ACTIVITY PATTERNS," filed Jun. 29, 2014, which is hereby incorporated by reference in its entirety.

BACKGROUND OF THE INVENTION

1. Field of the Invention

Embodiments of the present invention generally relate to messaging in communication systems and, more particularly, to systems and methods for managing high volumes of incoming messages.

2. Description of the Related Art

The volume of e-mail, inclusive of voice-to-text messages, arriving in a recipient's inbox can be both unpredictable and overwhelming. Depending on a person's meeting schedule, there may be insufficient time to read, let alone acknowledge and respond to, even a fraction of the e-mail that may arrive in the course of a business day. This issue is only exacerbated when the recipient must travel, attend training or seminars, or is out of the office (e.g., on vacation). While rules-based approaches to dealing within the management of e-mail messages are well known, they are somewhat inflexible and typically require a substantial effort on the part of the user for setup and maintenance. As a result, e-mail users may be slow or unwilling to embrace such approaches.

Moreover, the inventors herein have observed that current email applications, whether hosted at a server or executing as a client application on a recipient's communication terminal, neither track dynamically changing e-mail account patterns in email usage, activity, or behavior, nor provide any suggestion of what action might be taken on the recipient's behalf, when certain patterns or changes in patterns are detected. A lack of effective techniques and systems for dealing with such problems as a transient increase in the volume of unread messages in an inbox can be stressful to the email recipient and result in less efficient usage of email as a business tool.

A need therefore exists for configurable, dynamically adaptive, and user friendly techniques for managing excessive email volumes.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for aiding an email recipient in the management of inbound email by detecting, and configurably responding to, dynamically variable patterns of activity and behavior is described. According to one or more embodiments, the method extracts characteristics from new email messages addressed to the recipient and received from a plurality of senders. In some embodiments, the method analyzes statistics accumulated from the extraction of characteristics from email messages previously received by the recipient. In embodiments, the statistics include time and date of receipt in the recipient's inbox, time and date first read by the recipient, the frequency of email messages received by the recipient from each of a plurality of senders over time, and the rate(s) at which emails received from each sender and/or a plurality of senders in the aggregate are read, responded to, and/or managed by the recipient. The method identifies one or more patterns of behavior or activity in the accumulated statistics.

In some embodiments, the method identifies patterns specific to the e-mail messages sent by a particular sender, patterns applicable to the way the recipient responds to and/or manages email sent by a particular sender, and/or patterns applicable to the way the recipient responds to and/or manages email sent by a group of senders in the aggregate, wherein the group may comprise all senders from whom the recipient has received email messages, or a subset of such senders. As used herein, "manages" includes categorizing emails, filing email under various subfolders, flagging email as "To Do" items, and deleting emails. Before the recipient reads and/or manages a new email message, a determination is made as to whether any deviation from an identified pattern exists; and, if so, a pre-existing rule for treatment of the new message can be enforced and/or a new rule specifying treatment of at least some messages from the sender of the email is proposed. In some embodiments, a pre-existing rule is slightly modified based on a combination of recently monitored behavior and longer term behavioral history? Or, if such a rule does not exist yet, a new own is established based on the recipient's behavior.

In another embodiment, an apparatus for aiding an email recipient in the management of inbound messages by detecting, and configurably responding to, dynamically variable patterns of activity and behavior is described. A computer having one or more processors, memory and at least one network interface, further comprises a message manager module including instructions executable by the one or more processors. According to one or more embodiments, the message manager module is operative to receive a new email message for a recipient from a first sender, and to extract email characteristics from the received email message. In an embodiment, the message manager module is further operative to determine one or more of the following: (a) a contemporaneous volume or rate of change in a volume of new e-mail messages from the first sender and intended for the recipient; (b) a contemporaneous volume or rate of change in a volume of new e-mail messages from a plurality of senders and intended for the recipient; (c) a contemporaneous rate of change in a volume of at least one of new messages received from the first sender and read by the recipient or email messages received from the first sender and managed by the recipient; and (d) a contemporaneous rate of change in a volume of at least one of new messages received from a plurality of senders and read by the recipient or email messages received from the plurality of senders and managed by the recipient. In an embodiment, the message manager module is further operative to access usage statistics comprising at least one of sender frequency statistics, recipient response statistics or management rate statistics gathered by extraction of email characteristics from prior email messages, and to perform, on the received email message, an action according to a determined contemporaneous volume or rate.

In yet another embodiment, a computer readable medium for aiding an email recipient in the management of inbound messages by detecting, and configurably responding to, dynamically variable patterns of activity and behavior is described. According to one or more embodiments, the computer readable medium comprises instructions that, when executed by a processor, cause a system to: extract email characteristics from a new message received from a first sender and intended for a recipient, and to identify, from statistics derived from previously received messages, at least one of a pattern of recipient message management or message response behavior relating to treatment of messages from each of a plurality of senders or a pattern of sender activity. The medium further comprises instructions that, when executed by a processor, cause a system to detect, prior to reading of the new message by the recipient, whether any deviation from an identified recipient response/management pattern exists and, if a deviation is detected, to perform an action on the received message or propose taking of such action to the recipient.

In an embodiment, if the system detects the absence of any recipient action, contrary to an identified behavioral pattern on the part of the recipient, the system proposes taking the "typical" action normally undertaken by the recipient. For example, if the recipient typically reads an email from a particular sender within ninety minutes but now fails to do so, the system could remind the user to read that particular sender's email.

Figure 1A:
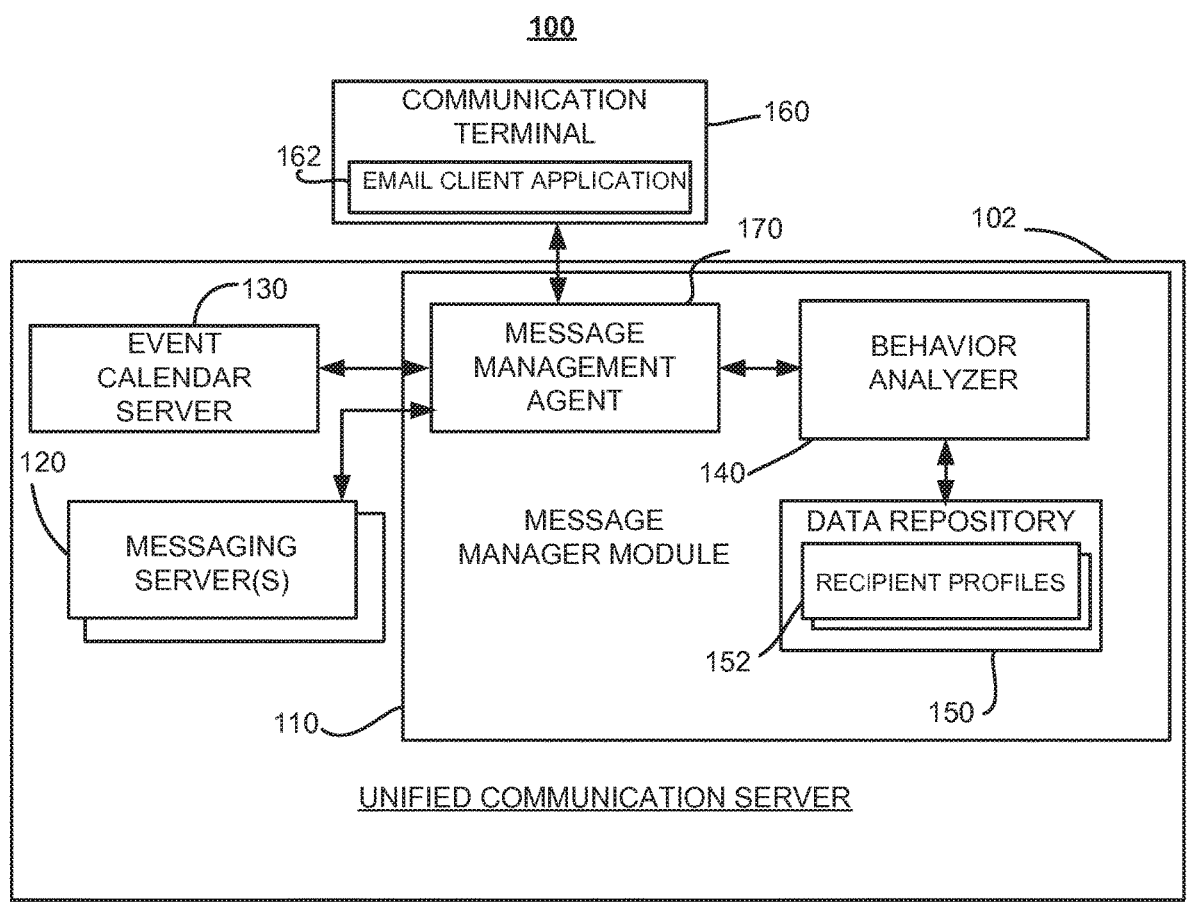
FIG. 1A is a block diagram depicting a communication system configured to aid email recipients in the management of their email, through detection and analysis of dynamically variable behavior and activity patterns, according to one or more network centric embodiments.

While the method and apparatus is described herein by way of example for several embodiments and illustrative drawings, those skilled in the art will recognize that the method and apparatus for dynamically responding to requests and queries for information relating to one or more event invitees or attendees is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for dynamically responding to requests and queries for information relating to one or more event invitees or attendees defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments Systems and techniques for aiding an email recipient in the management of inbound email by detecting, and configurably responding to, dynamically variable patterns of activity and behavior are described. Characteristics are extracted from new email messages originated by a plurality of senders and intended for a recipient. Patterns of sender activity, recipient message management behavior, and/or message response behavior are identified by analyzing statistics collected by the extraction of characteristics from email messages previously received by the recipient and correlating them with recipient behavior Before the recipient reads or manages a new email, a determination is made as to whether any deviation from an identified pattern exists with respect to the volume or a rate of change in the volume of new emails in the recipient's email account, or the rate at which the recipient is to read or manage (e.g., to reply, delete without reading, delete after reading, forward, flag, categorize, or archive new incoming emails). Examples of a deviating pattern or behavior change detected according to one or more embodiments include an inability to read or respond to any new inbound email messages over a period of selectable duration, an inability to reduce the volume of new/unread email messages in an inbox below a threshold for a period of time, or the existence of a scheduled conference call or meeting at a time when the number of new unread email messages exceeds a selectable threshold.

Current email applications hosted at a server or executing as a client application on a recipient's communication terminal neither track dynamically changing e-mail account patterns in email usage, activity, or behavior, nor provide any suggestion of what action might be taken on the recipient's behalf, when certain patterns or changes in patterns are detected. A lack of effective techniques and systems for dealing with such problems as a transient increase in the volume of unread messages in an inbox can be stressful to the email recipient and result in less efficient usage of email as a business tool.

Various embodiments of a method and apparatus for aiding an email recipient in the management of inbound email by detecting, and configurably responding to, dynamically variable patterns of activity and behavior are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts FIG. 1A is a block diagram depicting a communication system 100 configured to aid email recipients in the management of their email, through detection and analysis of dynamically variable behavior and activity patterns, according to one or more network centric embodiments. According to some embodiments, system 100 includes a unified communication server 102 having a messaging manager module 110 which includes a behavior analyzer 140, a data repository 150 containing email user account behavior profiles 152 ("recipient profiles"), including the recipient profile of a user of communication terminal 160 which executes an e-mail browser client or client email application program 162. Message manager module 110 further includes a message management agent 170. System 100 further includes one or more messaging servers including at least an email server and optionally an instant messaging server, and SMS messaging server, and a voice mail server and corresponding speech to text processor, collectively referred to as messaging server 120, and an event calendar server 130.

Figure 1B:
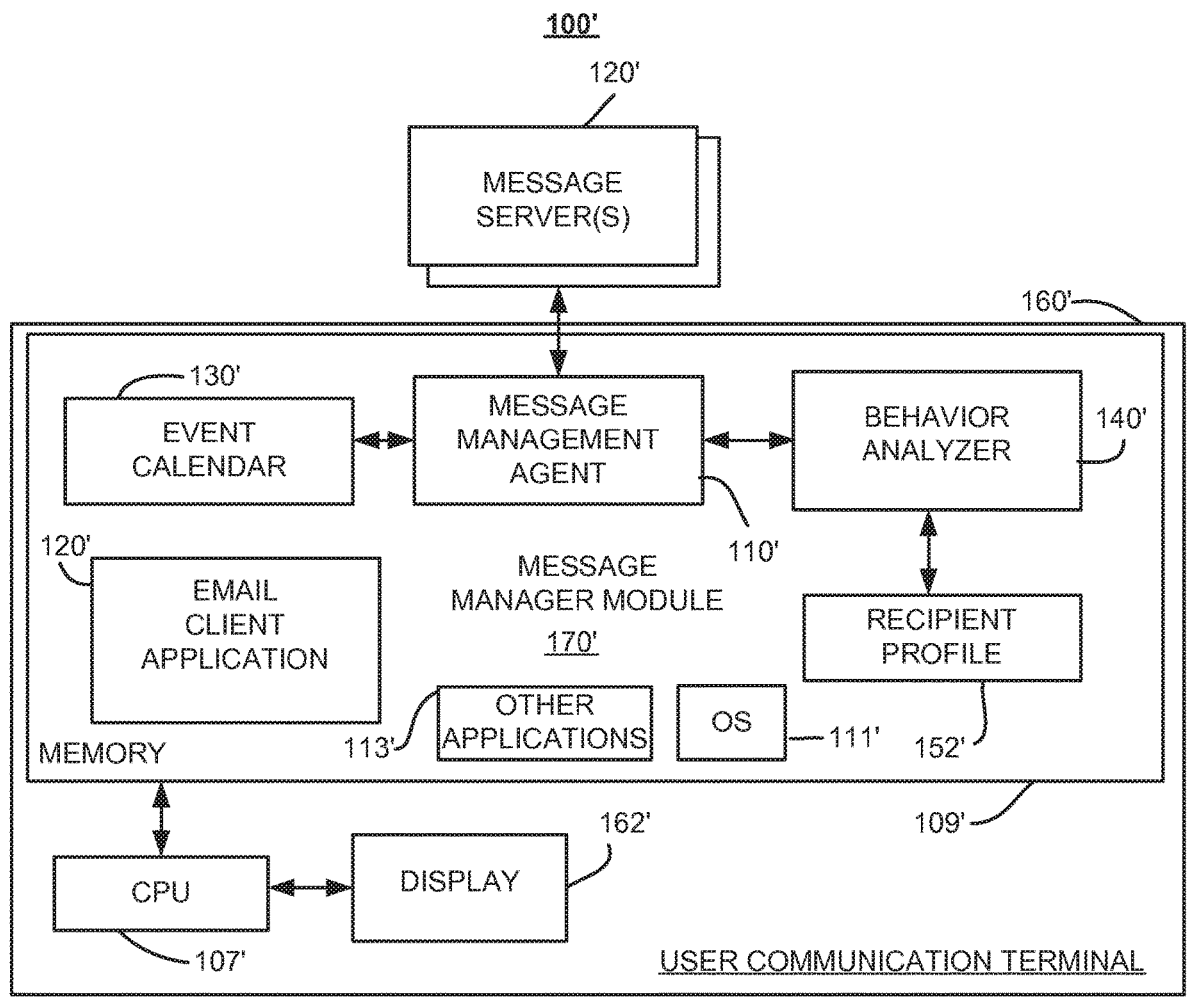
FIG. 1B is a block diagram depicting a communication system configured to aid email recipients in the management of their email, through detection and analysis of dynamically variable behavior and activity patterns, according to one or more communication terminal (e.g., "endpoint") centric embodiments.

FIG. 1B is a block diagram depicting an embodiment of a communication system 100' configured to aid email recipients in the management of their email, through detection and analysis of dynamically variable behavior and activity patterns, according to one or more communication terminal ("user endpoint") centric embodiments. The arrangement of and interrelationships between the various functional components of the embodiment of FIG. 1B are very similar to those of the embodiment of FIG. 1A. A principal difference between the respective embodiments is that in the former case, contemporaneous monitoring and evaluation of contemporaneous e-mail behavior and/or activity patterns against a recipient profile, are performed locally by a message manager module 110' program executed locally on the recipient device rather than at a central server. In the illustrative embodiment of FIG. 1A, on the other hand, at least some of the message manager module's behavior/activity data collection and/or pattern and usage monitoring functions are performed remotely at a central server.

In an embodiment, system 100' includes a communication terminal 160' having a central processing unit (CPU) 107', support circuits, a memory 109' containing an operating system 111' and applications executable by CPU 107', and an associated display 162'. One of the applications residing in memory 109', message manager module 110' contains message management agent 170', which is communicatively coupled by a network connection to one or more remote messaging server(s) 120'. Also communicatively coupled to the message management agent 170' are an event calendar application 130', a behavior analyzer application module 140', and a recipient profile 152' containing information derived from email usage and behavior statistics collected over time for the user of communication terminal 160'.

Each of the embodiments of FIGS. 1A and 1B require the adoption and enforcement of a set of rules which, after a period of monitoring email account usage to identify baseline usage, behavior and/or activity patterns and thresholds, are proposed to and/or adopted by the user. According to some embodiments, message manager agent is programmed to:

inspect the sender field of each email envelope over time, gathering frequency statistics to determine how often a particular sender sends email to a recipient of email using terminal 160. In an embodiment, if the message management agent determines that the send rate from a particular sender exceeds a threshold set, for example, at the mean plus 3*standard deviation, a prompt is generated to ask if the user wishes to adopt a new rule by "unsubscribing" to future emails from the sender and, if so, message management agent 170 thereafter enforces that rule by, for example assigning the senders email to a folder;

gather response statistics so as to enable message management agent 170 to determine how often and how quickly the recipient responds to email from a particular sender (e.g., as by reply email, return phone call, a phone call responsive to the email, or forwarding an email or voice mail message to a colleague for attention). According to some embodiments, message management agent 170 analyzes the response statistics to determine if a contemporaneous response rate (which may be, for example, an aggregate average response rate applicable to all message senders/originators, a sender-specific average rate applicable only to the specific sender, or both)—collected during a monitoring interval immediately prior to or encompassing the time of receiving a current new message—is at or below or above a threshold. By way of illustrative example, the threshold may be set at the mean plus 2*standard deviation;

monitor the rate at which new email is arriving in the recipient's inbox. According to an embodiment, message management agent 170 compares the new incoming rate to the recipient's contemporaneous inbox management rate (e.g. the rate at which the recipient has been recently/currently replying to, filing, deleting before reading, deleting after reading, archiving, or forwarding emails and, optionally, voice mails). In an embodiment, if message management agent 170 detects that the incoming email rate exceeds the management rate by a threshold number or fraction, one or more rules are enforced, or proposed to the user for future enforcement. For example, for those senders identified by message management agent 170 as being persons or entities to whom the recipient responds, on average, below a threshold rate, a message is automatically sent (with an optional prompting to the recipient to confirm that it should be sent) to notify the sender that the message has been received and that the user will respond shortly but is currently in a meeting (or is otherwise unavailable);

determine, according to an embodiment, whether one or more senders who have, on average, received a response within a first threshold during a time have sent an email or left a message at a time when the recipient's contemporaneous ratio of incoming email rate to management rate is above a second threshold. In an embodiment, message management agent 170 is operative to deal with an apparently transient drop in responsiveness/management wherein it may be an indefinite but lengthy amount of time before the recipient will be able to respond to the email of important senders. To this end, message management agent 170 is configured, in accordance with a rule or with temporary authority requested from and granted by the recipient), to automatically generate and transmit an automated e-mail response (or voice mail message, as the case may be). Examples of such a message include "I am overwhelmed with e-mail" or "I currently have limited availability, but will get to your email as soon as I can", or the like;

prompt the recipient to specify whether s/he would like to unsubscribe from emails sent, by a particular sender, from which point that sender's messages (email and, optionally voicemail as well) would be deleted upon receipt. In some embodiments, message management agent 170 determines whether there is a prolonged delay (e.g., in excess of a selectable or default threshold), on average, for reading/responding or reading/deleting messages from certain message originators (or email domains). In an embodiment, the aforementioned prompt is sent, or corresponding action taken by message management agent, if the message management agent 170 determines also that the recipient's response to email and/or voice mail messages from this particular originator/sender is often/always to delete the email unread, or that the sender/originator typically deletes emails from a sender very quickly (e. g., within 10 seconds of receipt), and this manner of treatment recurs over time. In some embodiments, a distinction is made between "destructive" pattern deviations as opposed to "constructive" ones. For example, if the recipient typically does not respond to Sender A's emails, but more recently has done so (which may or may not be an incipient "constructive" trend), the system can keep silent (or prompt the recipient to adopt a new rule). If, on the other hand, the recipient has historically responded to Sender B's emails but now deletes one from that sender unread (which may or may not be an incipient "destructive" trend), the system could alert the recipient;

take into account the recipient's event calendar such that any of the illustrative actions discussed above, which might otherwise be proposed or taken by message management agent 170 based on contemporaneous measurements of incoming rate vs. management rate are modified or suspended based on the recipient's current and upcoming ("near term") schedule. For example, if a recipient has seventeen new emails and back-to-back meetings scheduled in 2 minutes, different messages can be sent to senders which take this into account, and prompts can be directed to the recipient to proactively take action on the recipient's behalf;

identify and monitor any correlation between received email content and recipient action and, in some embodiments, alert the user if the user breaks a pattern. In an embodiment, message management agent 170 examines not just the envelope but also the content of a message. If an email account user tends to read/respond quickly to those emails or voicemails that contain certain keywords, and then departs from the standard treatment message management agent is operative to generate and send an alert to the recipient. In some embodiments, the key words are predefined by the user, and in others, words and phrases contained in email messages which are recurrently responded to quickly are stored, automatically and without user intervention, as data attributes in a data repository. Over time, a weighted distribution based on such criteria as frequency, average response time, sender identity, markings of critical or urgent in the message envelop, and the like can be used to refine the contents of the database. In some embodiments, after a period of monitoring, a list of keywords generated automatically can be presented to the user for further refinement (i.e., supplementation by the adding of keywords and phrases, the redaction of key words and phrases, or the like. As an example, if emails or voicemail message containing a combination of the words "meeting", "review", "performance" are consistently responded to with dispatch, and the user invokes an email client action to delete a message containing such keyword(s) without reading the email, then message management agent 170 generates an alert and asks the user to confirm such action;

deduce an "out of office" situation based on a detected sender/receiver email/response pattern. The user management agent 170 can then follow the user by sending a notification of a proposed action outside of corporate email: it can call, text, instant message, personal-email the intended recipient and install out of office messages automatically based on a received response;

automatically (or with user consent) simulate a "bounce back" to mitigate spam based on the speed of email deletion or prior deletion of unread emails originating from a particular sender. Such an implementation can be implemented from the client application, enabling the granular application of user defined or automatically rules in a way that is not supported by hosted commercial email servers and solutions; and "override" any rules developed, proposed and implemented according to one or more embodiments, as in the case of a recipient's key colleagues, supervisors, and subordinates. According to an embodiment, the user of systems 100 or 110, so that exempt individuals or groups of individuals (by name, title, domain) can be defined—responses to such individuals could be subject to a different set of rules from those specified above, or to no rules at all.

Figure 2:
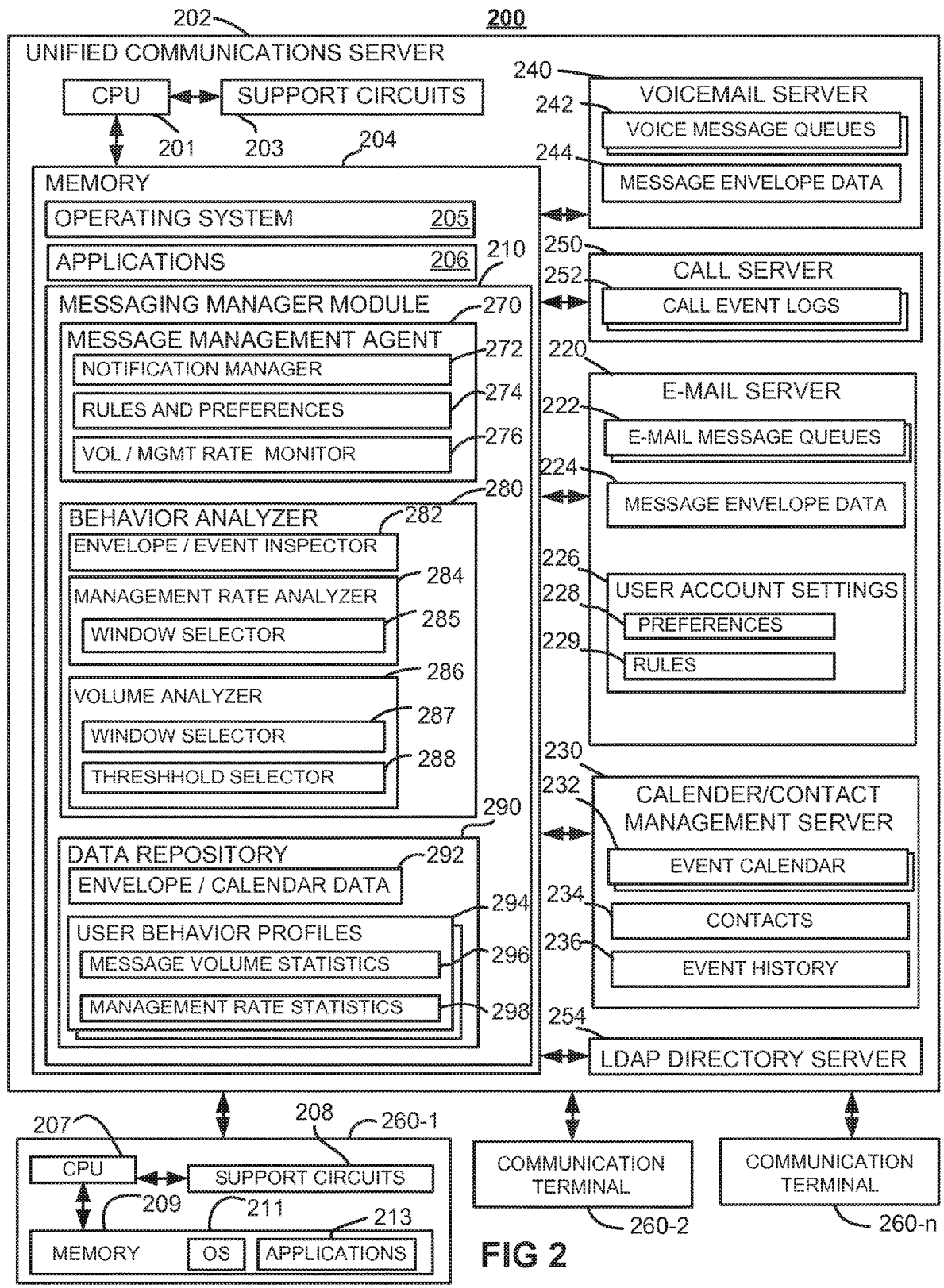
FIG. 2 is a block diagram depicting, in greater detail, the interaction between the functional components according to the embodiments exemplified by FIG. 1A.

FIG. 2 is a block diagram depicting, in greater detail, the interaction between the functional components in a system 200 according to embodiments exemplified by FIG. 1A. The various components of system 200, including unified communication server 202, email server 220, calendar/contact management server 230, voicemail messaging server 240, call server 250, and an LDAP directory server 254, and user communication terminals 260-1 to 260-n are connected by one or more network links. Some of the links are established by a network which includes a communication system that connects computers (or devices) by wire, cable, fiber optic and/or wireless link facilitated by various types of well-known network elements, such as hubs, switches, routers, and the like. The network interconnecting some components may also be part of the Intranet using various communications infrastructure, such as Ethernet, Wi-Fi, a personal area network (PAN), a wireless PAN, Bluetooth, Near field communication, and the like.

The various servers 202, 220, 230, 240, 250 and 254, are each a computing device, or may be the same computing device as, for example, a desktop computer, laptop, tablet computer, and the like, or they may be cloud based servers e.g., a blade server, virtual machine, and the like. For each provisioned calendar/contract management services user or subscriber, calendar/contact management server 230 provides services to a calendar application on user terminals 260-1 to 260-n. For example, calendar server 230 provides to user terminal 260-1 an event calendar 232, including schedule information, directory services ("Contacts") 234, event history 236, and email services. Likewise, for each provisioned voice mail user or subscriber, voice mail server 240 maintains a voice mail message queue 242 and message envelope date 244 indicating a date and time when a voice mail message was left for the user, an identification of the caller or caller's extension (if available), whether and when a voice mail message was forwarded to another extension (a voice message forwarded to another party qualifying as a "response" according to one or more embodiments), and an indication of a date and time when the user first accessed the voice mail. In some embodiments, server 202 further includes a speech-to-text interface (not shown) operative to convert voice messages into email messages.

For each provisioned telephony services user or subscriber, call server 250 maintains call event logs 252 The call event logs include an incoming call log indicating a date and time when a call for the user was received, an identification of the caller's identity, phone number or extension (if available), and an indication of whether and when (date/time) each call was answered by the user or forwarded to voice mail message or to another extension (with answering or forwarding a call received from an email sender each qualifying as a "response" to an email message received from the sender if performed subsequent to receiving and reading the email message, according to some embodiments), and an indication of a date and time when the user first accessed the voice mail. By way of illustrative example, a speech to text converter (not shown) associated with unified communication system 202 may be configured to search transcribed content of the dialog between a caller and call recipient to identify the presence of any key words in the call also present in the received email.

The call event logs 252 further include an outgoing call log indicating a date and time when a call by the user was made, an identification of a number of the number dialed, and an indication of the duration of the call. According to one or more embodiments, a call log entry indicating that the user called the sender of an email qualifies as a "response" to an email message received from the sender if performed subsequent to receiving and reading the email message. As already mentioned, speech to text converter (not shown) associated with unified communication system 202 may be configured to search transcribed content of the dialog between a caller and call recipient to identify the presence of any key words in the call also present in the received email. According to one or more embodiments, LDAP directory server 254 provides caller and call recipient directory lookups as needed to support the aforementioned response classifications.

For each provisioned email user or subscriber, email server sever 220 maintains an email message queue 222 and message envelope information 224 identifying the sender's email address, recipient's email address, the date and time of delivery to an email inbox, and user account settings 226 including rules and preferences 228 and rules 229 defined by the user. Such rules are enforceable by the email server 220 and are typically designed to reduce the amount of email which must be stored on the server pending user review, to separate and prioritize email for the user so that the limited time the user may have to review his or her email is effectively utilized, to organize the user's email to make it easier to find and/or reference email as needed, and/or to send a simple message to email senders during a particular time interval selected by the user. According to one or more network embodiments, these rules are supplemented by rules generated and proposed, for adoption by the email account user, by detecting, and configurably responding to, dynamically variable patterns of activity and behavior. In an embodiment, some or all of the supplemental rules, once adopted by an email user, are stored as part of the rules 229.

To this end, according to some embodiments, unified communication server 202 includes a messaging manager module 210 comprising a set of instructions residing in memory 204 and executable by a Central Processing Unit (CPU) 201. The CPU 201 may include one or more commercially available microprocessors or microcontrollers that facilitate data processing and storage. Various support circuits 203 facilitate the operation of the CPU 201 and include one or more clock circuits, power supplies, cache, input/output circuits, and the like. The memory 204 includes at least one of Read Only Memory (ROM), Random Access Memory (RAM), disk drive storage, optical storage, removable storage and/or the like.

In addition to message manager module 210, memory 204 includes an operating system 205, and a plurality of applications including 206 including the aforementioned optional speech-to-text converter. Message manager module 210 includes a message management agent 270 comprising a notification manager 272 for generating prompts and alerts to be sent or presented to the users of terminals 260-1 to 260-n as well and for generating notifications to be sent or presented to email senders according to one or more rules or preferences 274 adopted by the user and in response to patterns and/or activity monitored by volume/management monitor ("monitor") 276. In some embodiments, monitor 276 is operative, through instructions executed by CPU 201, to monitor the flow of incoming new email messages over a contemporaneous monitoring window. Such monitoring can include refers to counting the number of new email messages over the monitoring window, from which calculations like a rate of change in the volume of new and/or unread email messages with respect to time can be computed. As used herein, a "contemporaneous monitoring window" or, simply, "monitoring window" refers to a period of time (whether of predetermined or selectable duration) that immediately precedes or encompasses a moment in time when a particular new message to be processed by message management agent 270, has been received in a recipient ("user") inbox. The messages include emails, but can also include voice mail messages, as well as SMS text messages, and instant messages received by SMS and Instant Messaging servers (not shown), respectively. By way of illustrative example, a contemporaneous monitoring window may be from four minutes in duration to four hours in duration.

Monitor 276 is further operative, through instructions executed by CPU 201, to collect instantaneous message management rate volume measurements over a contemporaneous monitoring window. The management rate refers, according to some embodiments, to the rate at which the user performs on or more actions on new or unread messages. The actions typically include reading plus one more action such as forwarding a message to a colleague, sending a reply, sending a text message, sending an SMS, sending an instant (1M) message, calling or leaving a voice mail to the originator of the message. Even the act of reading a message, however, is included as part of the management rate in some embodiments, however. By tracking the number of such actions over time, monitor 276 is able to perform instantaneous computations of the rate of change in unread message volume. By comparing the ratio of the management rate to the new email incoming rate and/or the unread message accumulation rate, or the numbering distance between these values, message management agent 270 can identity any change in the pattern substantial enough to be a deviation from the historical pattern.

To allow such identification to take place, however, message manager module 210 further includes a behavior analyzer 280 which comprises an envelope/calendar event inspector/call log inspector ("inspector") 282, a management rate analyzer ("analyzer") 284, and a volume analyzer 286. Similar in all respects to monitor 276 (and is combined therewith in some embodiments), inspector 282 is operative, through instructions executed by CPU 201, to collect incoming (new) rate, and/or accumulated unread rate, as well as management rate statistics. However, these are collected over a longer time frame and form the basis of deriving and identifying a baseline for user and sender behavior and/or activity patterns. The longer time frame is referred to herein as a baseline pattern identification window (or, simply "baseline window"). The baseline window can be substantially longer than the contemporaneous monitoring window and generally precedes (though it can also encompass) the moment in time when a particular new message, to be processed by message management agent 270, has been received in a recipient (or "user") inbox. By way of illustrative example, a baseline pattern identification window may be from 5 minutes in duration to 5 months in duration.

Management rate analyzer 284 includes a window selector which allows the duration of the baseline window to be dilated or compressed, as needed, depending for example, on the volume of email and other messages which might be accumulated by an especially busy recipient vs. one who has fewer incoming emails on an average basis but periodic spikes requiring individualized treatment. Volume analyzer 286 also includes a window selector 287, as well as a threshold selector 288. The latter selector, in some embodiments allows independent and selectable configuration of multiple thresholds as will be explained shortly, and therefore enables fine tuning specific to each recipient over time as the base of statistics collected for a particular recipient grows.

Message manager module 210 further includes data repository 290. In some embodiments, data repository 290 includes an envelope/calendar datastore 292 containing such data as currently scheduled meeting dates and times (retrieved, for example, from the event calendar 234 of server 230), as well as previously scheduled meeting dates and times (retrieved from event history 236 of server 230). Contact information, including the email address of other meeting invitees (any of whom may be originators of email, voicemail, SMS, IM and other kinds of messages managed by messaging manager module 210 according to one or more embodiments). Data repository 290 further includes user behavior profiles (also referred to herein as "recipient profiles) 294. Each recipient profile 294 includes, for example, message volume statistics and management rate statistics accumulated over the baseline windows and monitoring windows applicable to a particular recipient.

Each of user communication terminals or devices 260-1 to 260-n is a computing device, for example a desktop computer, laptop, tablet computer, Smartphone, and the like that includes or is connected to a display and user input devices such as a mouse, keyboard, touch screen, camera, microphone, etc. The user device 260-1, for example, is a computer tablet that includes a touch screen display (not shown), Central Processing Unit (CPU) 207, support circuits 208, a memory 209, as well as a network interface adapted to communicatively couple terminal 260-1 to server 202 via a wireless internet connection or other network connection.

CPU 207 includes one or more commercially available microprocessors or microcontrollers that facilitate data processing and storage. The various support circuits 208 facilitate the operation of CPU 207 and include one or more clock circuits, power supplies, cache, input/output circuits, and the like. The memory 209 includes at least one of Read Only Memory (ROM), Random Access Memory (RAM), disk drive storage, optical storage, removable storage and/or the like. The memory 209 includes an operating system 211 that provides a computing foundation for software applications 213 of the user device 260-1. The memory 209 includes applications such as a locally installed messaging application or a browser application for invoking a client messaging hosted by server 202.

FIGS. 3A-3F depict the gathering of statistics for detecting, and the setting of one or more thresholds for use in responding to dynamically variable patterns of activity and behavior according to one or more embodiments.

Figure 3A:
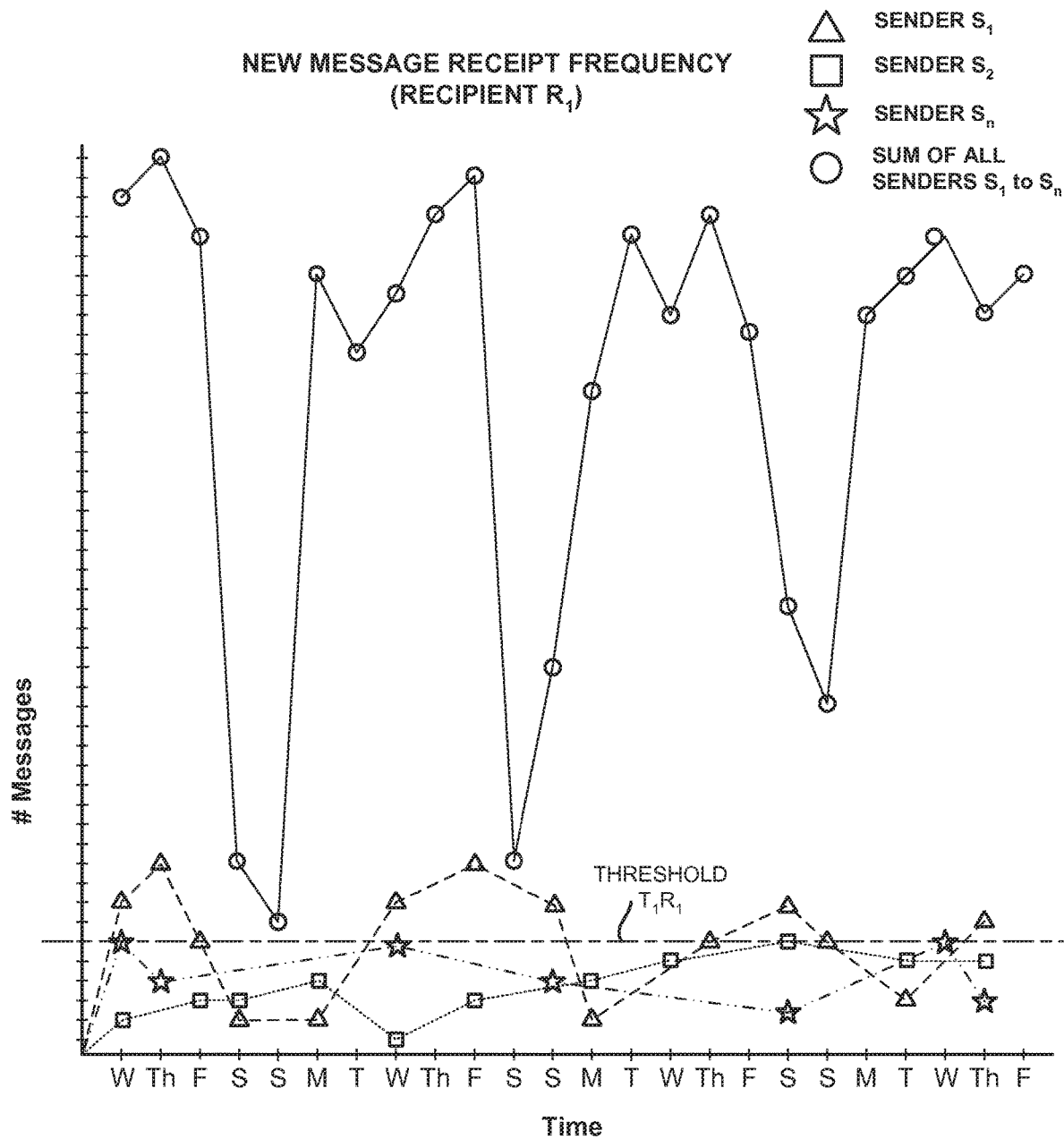
FIG. 3A is a graphical representation depicting the frequency at which a plurality of senders have sent messages, including email messages, to a recipient over time, forming a portion of statistics gathered according to one or more embodiments.

FIG. 3A is a graphical representation depicting the frequency at which a plurality of senders have sent messages, including email messages, to a recipient over time, forming a portion of statistics gathered according to one or more embodiments. In the representative example of FIG. 3, the number of new messages received by recipient $R.sub.1$ from senders $S.sub.1$ to $S.sub.n$ over a 24 day monitoring window is shown. As a consequence of Sender $S.sub.1$ exceeding the threshold $T.sub.1R.sub.1$, a possible response by message management agent 270 would be to offer the recipient $R.sub.1$ the opportunity to "unsubscribe" to messages from that sender, as previously described.

Figure 3B:
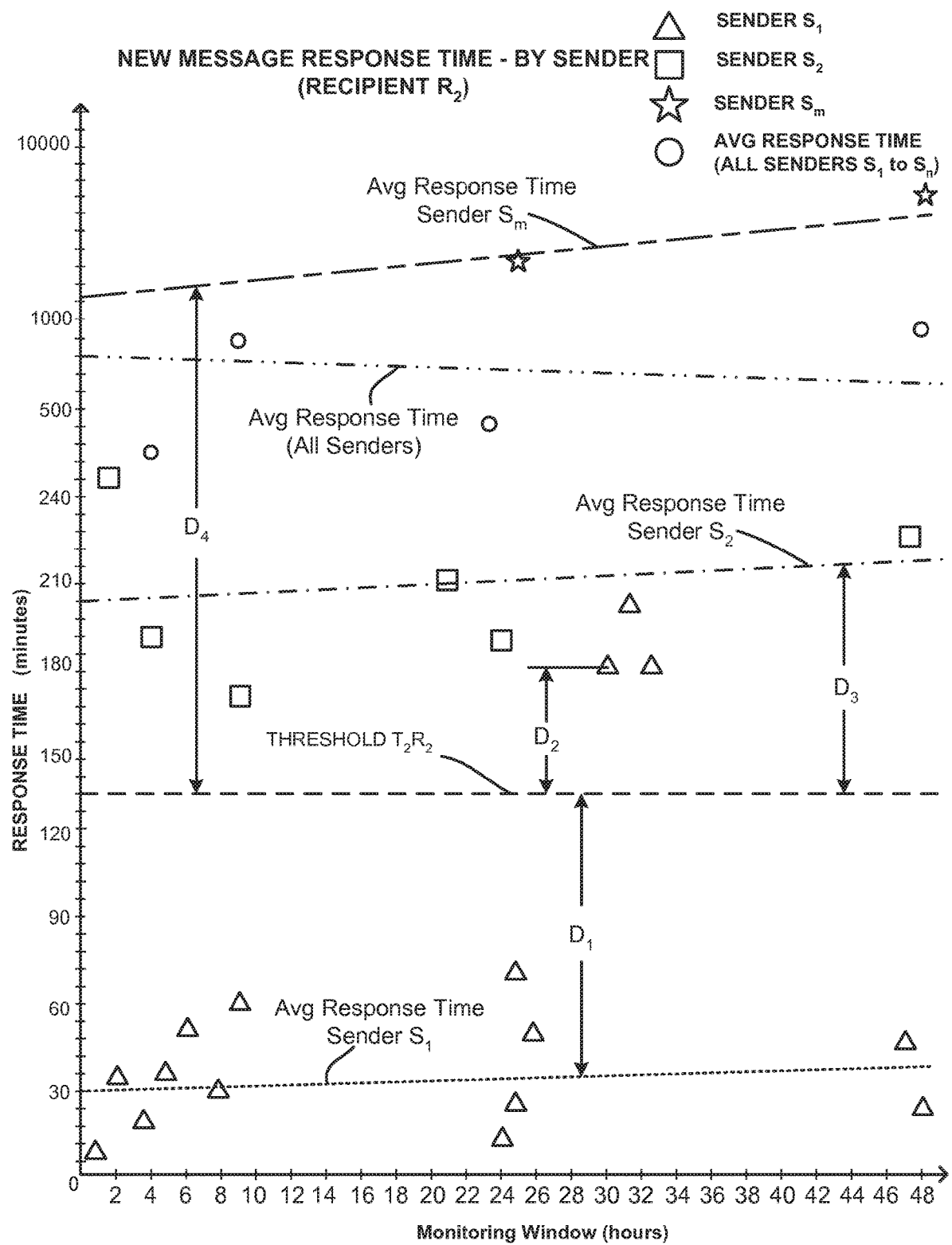
FIG. 3B is a graphical representation depicting the time taken by a recipient to respond to email messages received from a plurality of recipients over time, as well as average response times computed for selected senders, forming a portion of statistics gathered according to one or more embodiments.

FIG. 3B is a graphical representation depicting the time taken by recipient $R.sub.2$ to respond to email messages received from a plurality of recipients ($S.sub.1$ to $S.sub.m$) over time, as well as average response times computed for selected senders, forming a portion of statistics gathered and evaluated according to embodiments. Different average response (e.g., reply, forwarding, return call, etc) are computed and shown. For comparison an threshold $T.sub.2R.sub.2$ is set at, say the mean response time+ 3*standard deviation, such that those senders who receive responses below this threshold, such as sender S1 in the instant example, may receive special notifications generated by message management agent 270 at times when the recipient cannot respond or is not responding with the same usual level of dispatch reserved for that recipient. As an alternative threshold, an average response time is computed for all senders, in which case sender $S.sub.2$ may receive the same treatment as sender $S.sub.1$.

Figure 3C:
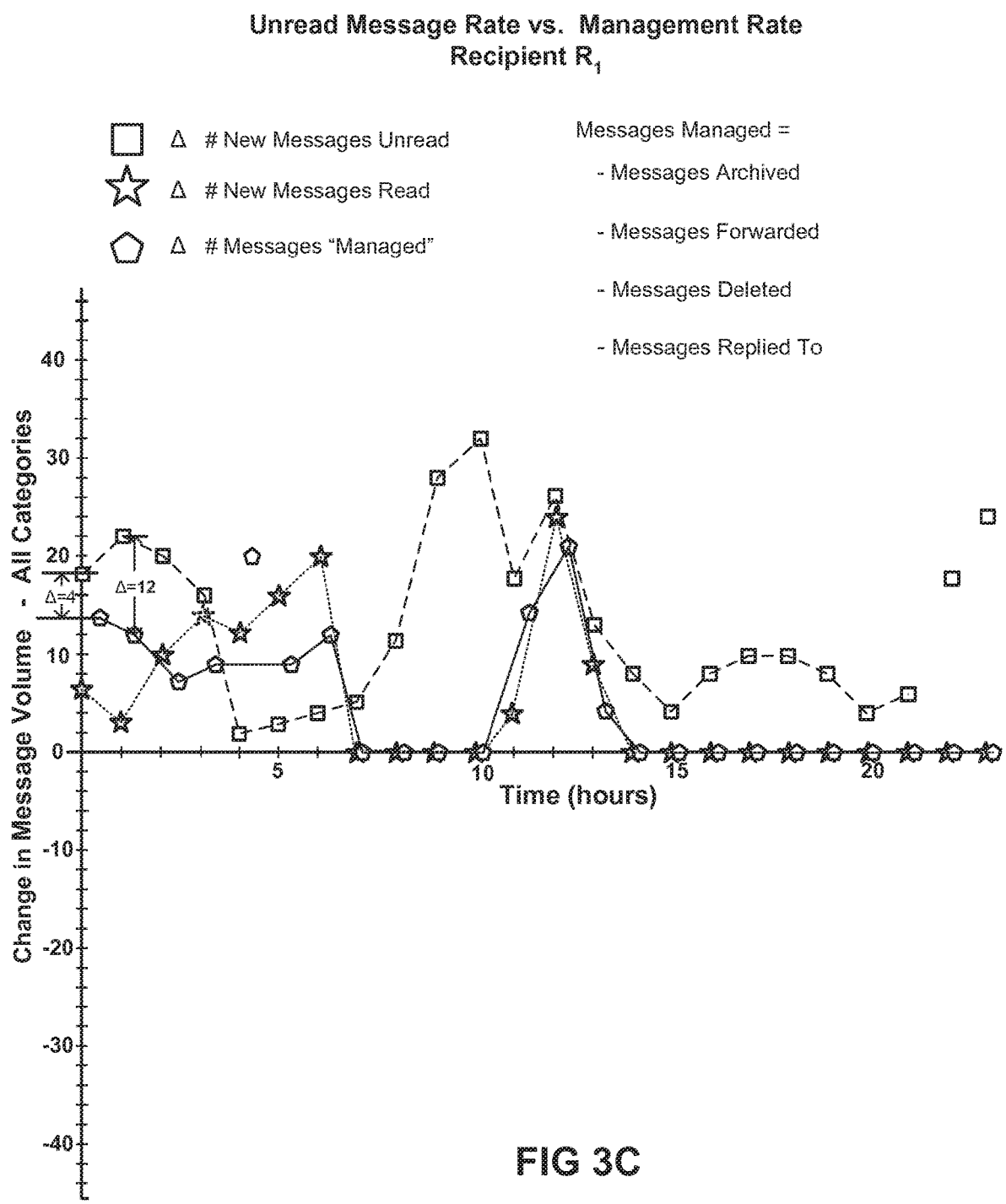
FIG. 3C is a graphical representation depicting monitored changes in the rate at which new unread messaged are accumulated in a recipient's email inbox, over a time window preceding but contemporaneous with receipt of email messages from a plurality of senders vs. monitored changes in the rate at which the recipient has replied to or managed received email messages during the same time window.

FIG. 3C is a graphical representation depicting monitored changes in the rate at which new unread messaged are accumulated in a recipient's email inbox, over a time window preceding but contemporaneous with receipt of email messages from a plurality of senders vs. monitored changes in the rate at which the recipient has replied to or managed received email messages during the same time window. In the instant case a spike in the accumulation of new/unread email messages in the inbox of recipient R1 is experienced beginning at about 8 hours into the twenty four hour monitoring window depicted. A message received during this time, for example, might receive a message automatically generated and transmitted by message management agent to the effect that the recipient is currently in a meeting or otherwise unavailable but that the recipient's message is important and will receive immediate attention upon return. Other possible treatments might be to route the message to a colleague or even prompt the colleague of recipient $R.sub.1$ to schedule a call with the sender.

Figure 3D:
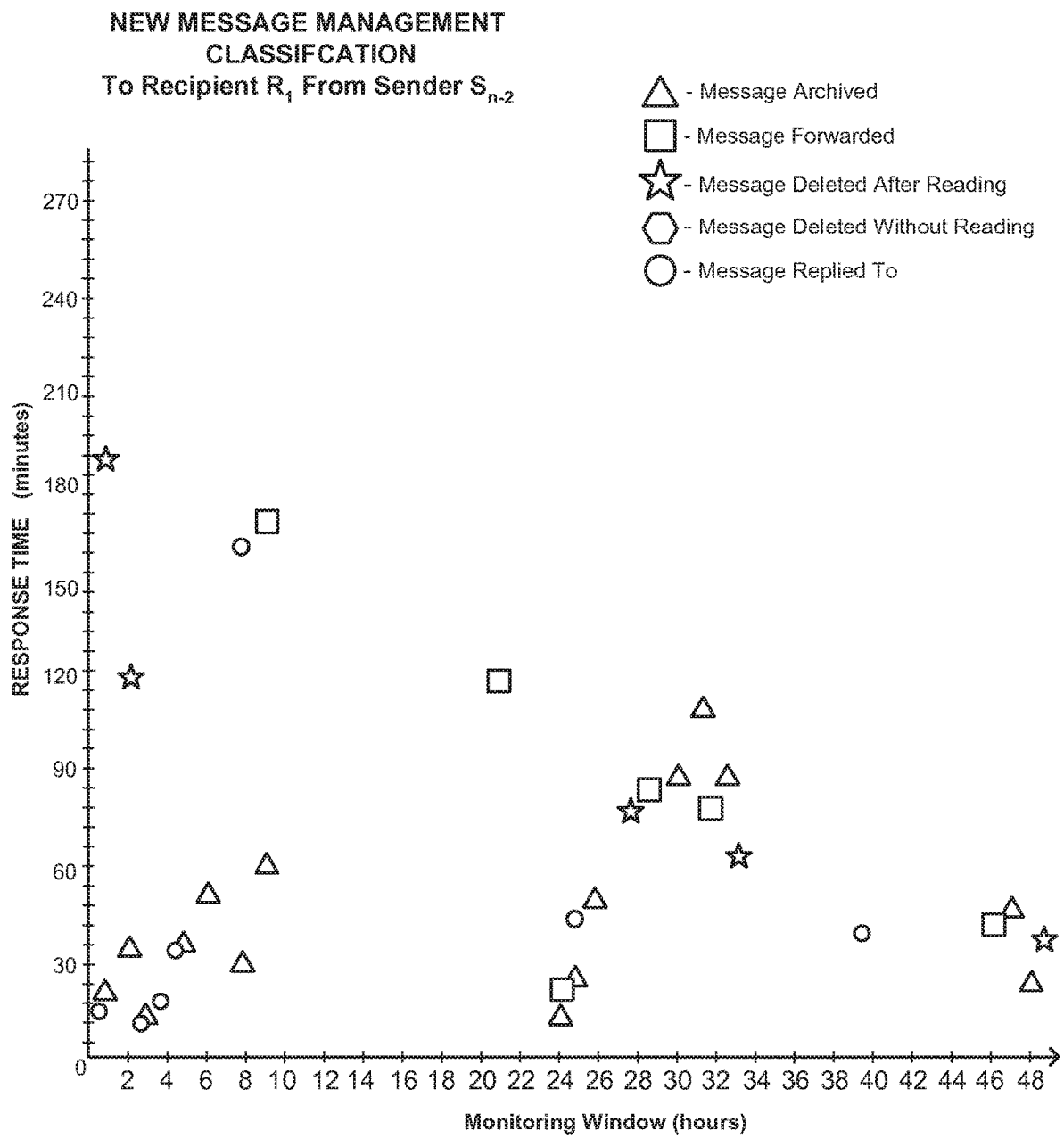
FIG. 3D is a graphical representation depicting the classification of e-mail management outcomes over a time window preceding but contemporaneous with receipt of email messages from a plurality of senders, during which a recipient has either archived, forwarded, deleted, replied to, or forwarded messages received from one specific sender.
Figure 3E:
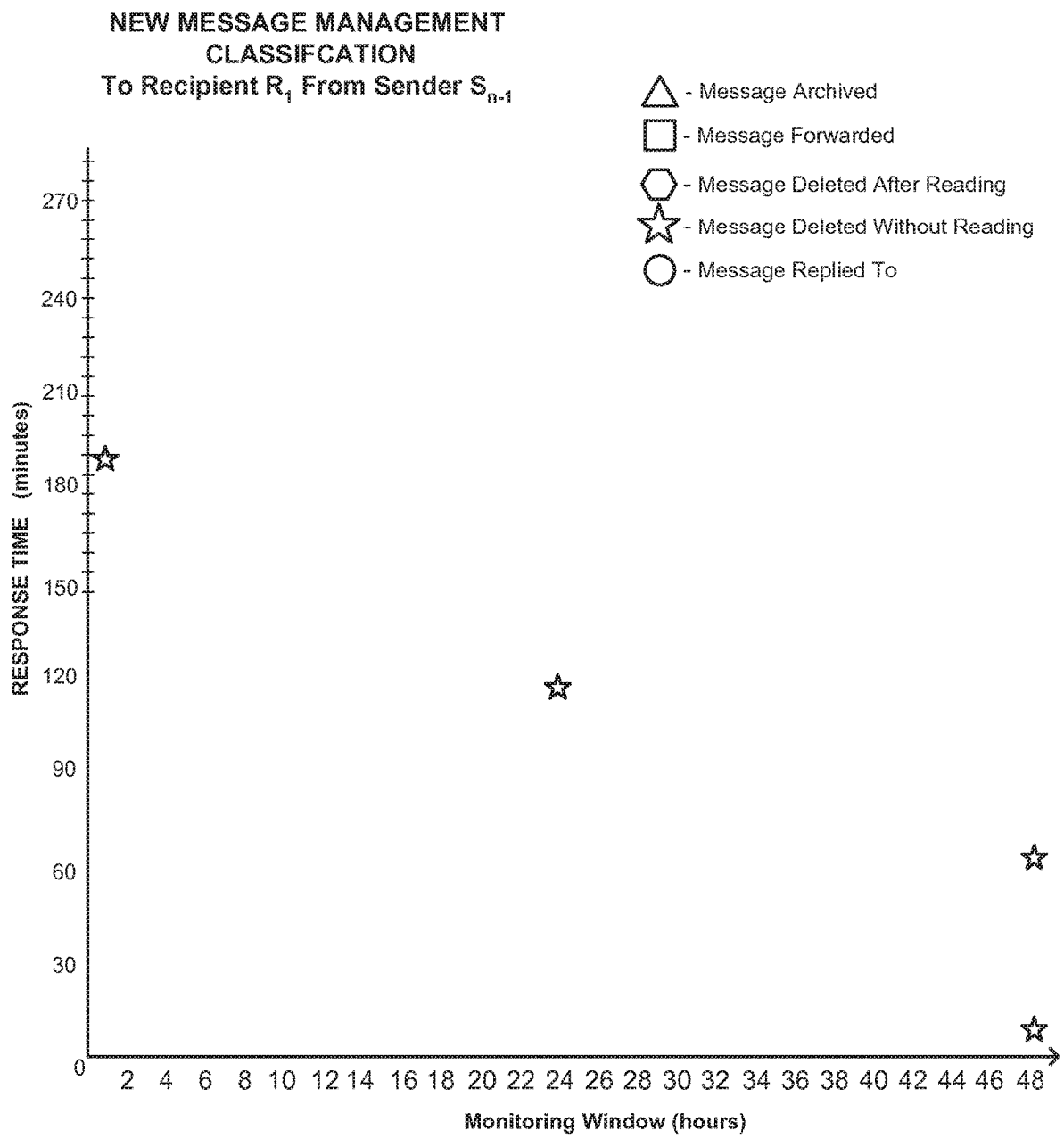
FIG. 3E is a graphical representation depicting the classification of e-mail management outcomes over a time window preceding but contemporaneous with receipt of email messages from a plurality of senders, during which a recipient has either archived, forwarded, deleted, replied to, or forwarded messages received from another specific sender.

FIG. 3D is a graphical representation depicting the classification of e-mail management outcomes over a time window preceding but contemporaneous with receipt of email messages from a plurality of senders, during which a recipient $R.sub.1$ has either archived, forwarded, deleted, replied to, or forwarded messages received from one specific sender $S.sub.n-2$. For granular treatment of senders according to one or more embodiments, it may be helpful to track the disposition of each message and the speed at which the disposition was reached. FIG. 3E, for comparison purposes, is a graphical representation depicting the classification of e-mail management outcomes over a time window preceding but contemporaneous with receipt of email messages from a plurality of senders, during which the same recipient (R2) has either archived, forwarded, deleted, replied to, or forwarded messages received from another specific $S.sub.n-1$. In this case, however, all of the messages received over the monitoring window were deleted without reading the messages. In this case, even without a baseline window representing a broader data set for comparison, message management agent 270 might prompt the recipient $R.sub.1$ to "unsubscribe" to email messages received from sender $S.sub.n-1$. Should the recipient accepting this new rule of application, the current messages as well as any future messages from that sender are deleted or sent to an archive or trash folder upon receipt.

FIG. 3E is a graphical representation depicting the classification of e-mail management outcomes over a time window preceding but contemporaneous with receipt of email messages from a plurality of senders, during which a recipient has either archived, forwarded, deleted, replied to, or forwarded messages received from another specific sender.

Figure 3F:
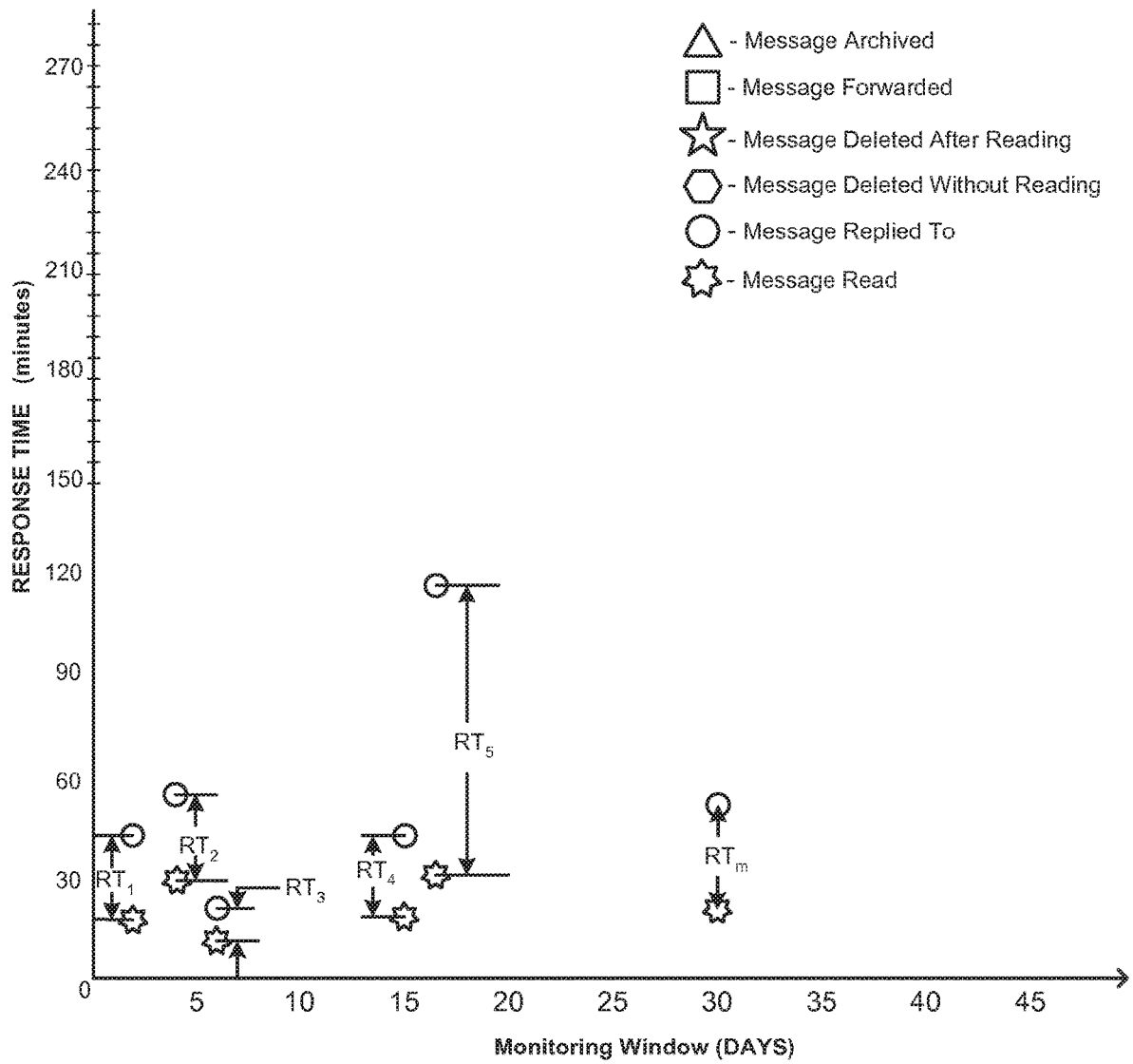
FIG. 3F is a graphical representation depicting the correlation of recipient response times to received email messages to the presence of one or more key words in those messages, over a time window preceding but contemporaneous with receipt of email messages from a plurality of senders.

FIG. 3F is a graphical representation depicting the correlation of recipient response times to received email messages to the presence of one or more key words in those messages, over a time window preceding but contemporaneous with receipt of email messages from a plurality of senders. As noted previously, the keyword(s) and phrases can be identified a priori by the user/email subscriber or they can be identified automatically by selecting all keywords for certain senders and/or certain read and/or reply time thresholds.

Figure 4:
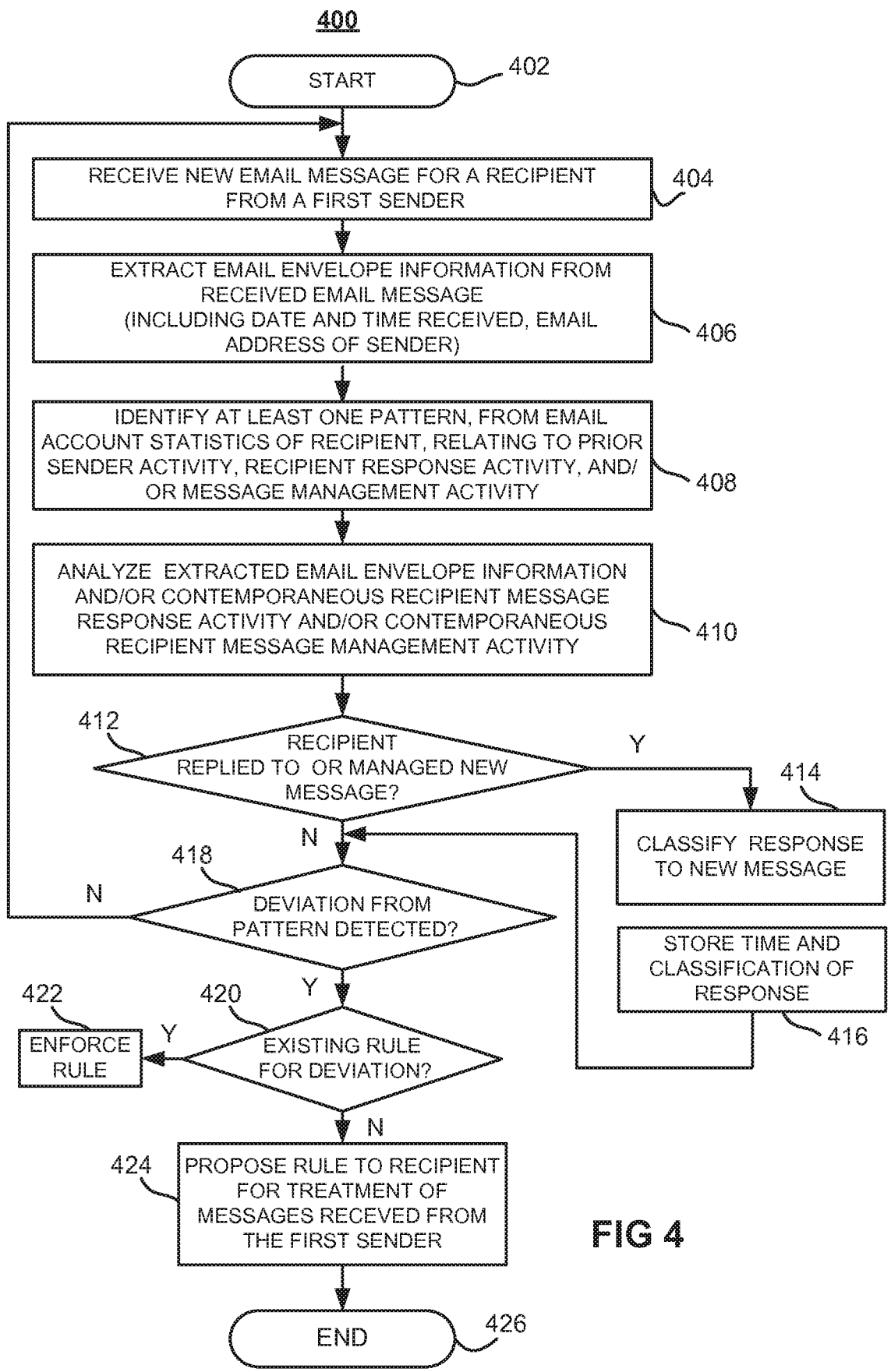
FIG. 4 is a flow diagram depicting a technique for aiding recipients in the management of their email, through detection and analysis of dynamically variable behavior and activity patterns, according to one or more embodiments.

FIG. 4 is a flow diagram depicting a technique for aiding recipients in the management of their email, through detection and analysis of dynamically variable behavior and activity patterns, according to one or more embodiments. The method 400 starts at step 402 and proceeds to step 404. At step 404 the method receives a new email message (or voice-, SMS-, text-, or IM-message) originated by a first sender and intended for a recipient. At step 406, the method extracts email envelope information from the received email message. This includes data and time of receipt and phone number of the sender. In some embodiments, other information available for the sender such as the sender's phone number may be associated with the extracted information. At step 408, the method identifies at least one pattern, from email account statistics of the recipient. The identified pattern may relate to prior sender activity (frequency of sending to the recipient), recipient response activity, and/or message management activity. At step 410, the method 400 analyzes the extracted envelop information and/or contemporaneous recipient message response activity and/or contemporaneous recipient message management activity. The method 400 proceeds to determination step At step 412, the method determines whether the recipient has replied to or otherwise managed the received new message. If so, the method classifies the response at step 414, stores the time/date and classification of the response at step 416, and proceeds to determination step 418. Otherwise, the method proceeds directly to step 418. At step 418, the method determines whether a deviation from any identified pattern is detected. If not, then the method returns to step 404 and receives another new message as so far described. If so, however, the method 400 determines first whether a rule for the deviation already exists and, if so this rule is enforced at step 422. If, not, then a new rule is proposed at step 424. In an embodiment, the rule proposes a treatment to be applied to all messages from the sender. In another embodiment, the treatment proposed applies only during certain times (such, for example, as in the event of a gross mismatch between accumulating unread email messages and management rate). The process then terminates at step 426 or returns to step 404 for processing of other messages already in the user's inbox.

Figure 5:
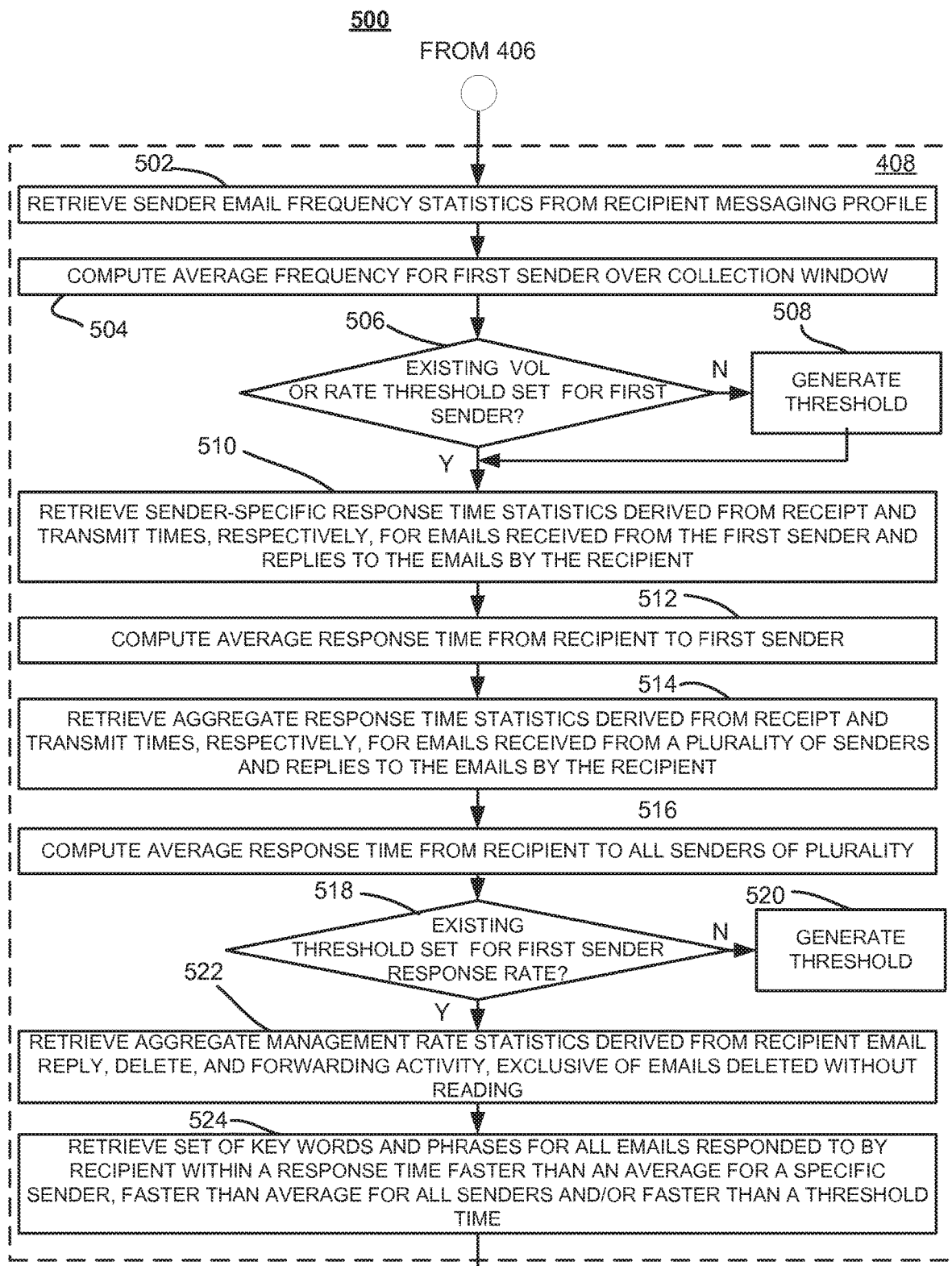
FIG. 5 is a flow diagram depicting discrete sub-steps applicable to the identification of one or more patterns through analysis of collected email account statistics, according to embodiments exemplified by FIG. 4.

FIG. 5 is a flow diagram depicting discrete sub-steps applicable to the identification of one or more patterns through analysis of collected email account statistics, according to embodiments exemplified by the method 400 of FIG. 4. From step 406 of method 400, the method 500 retrieves, at step 502, sender email frequency statistics, for a first sender, from the recipient messaging profile. The method proceeds to step 504. At step 504, the method computers an average frequency for the first sender over a collection or baseline window. At step 506, the method determines whether an existing volume or rate threshold has been set for the first sender. If not, one is generated at step 508, otherwise the method proceeds directly to step 510. At step 510, the method retrieves sender-specific response time statistics derived from receipt and transmit times, respectively, for emails received from the first sender and replies to the emails by the recipient (which can be via SMS text, IM, and voice mail as well as email in some embodiments). The method advances to step 512.

At step 512, the average time taken by the recipient to reply, call back or otherwise respond to the first sender (i.e., "response time) is computed. At step 514, aggregate response time statistics, derived from dates/times of messages to and from all or a subset of all recipients (each, "a plurality") is retrieved and at step 516, an average aggregate response rate is computed. At step 518, the method determines whether an existing threshold response rate has been set for use in evaluating the sender-specific response rate. If not, one is generated at step 520 and the process proceeds to step 522. At step 522, aggregate management rate statistics are derived from recipient reply, deletion and forwarding activity. For purposes of the aggregate rate calculation, the deletions without reading are excluded since these would tend to reduce the overall management rate and have little to no diagnostic value in an aggregate metric.

At step 524, the method retrieves a set of key words and phrases from all emails responded to by the sender in a faster than average time for a specific sender, faster than an average response time computed for all senders, and faster than average for senders, and/or faster than a threshold time. As previously described, when a user fails to respond to emails containing certain key words at a historic baseline rate, this could mean that the recipient has inadvertently skipped over the message.

Figure 6:
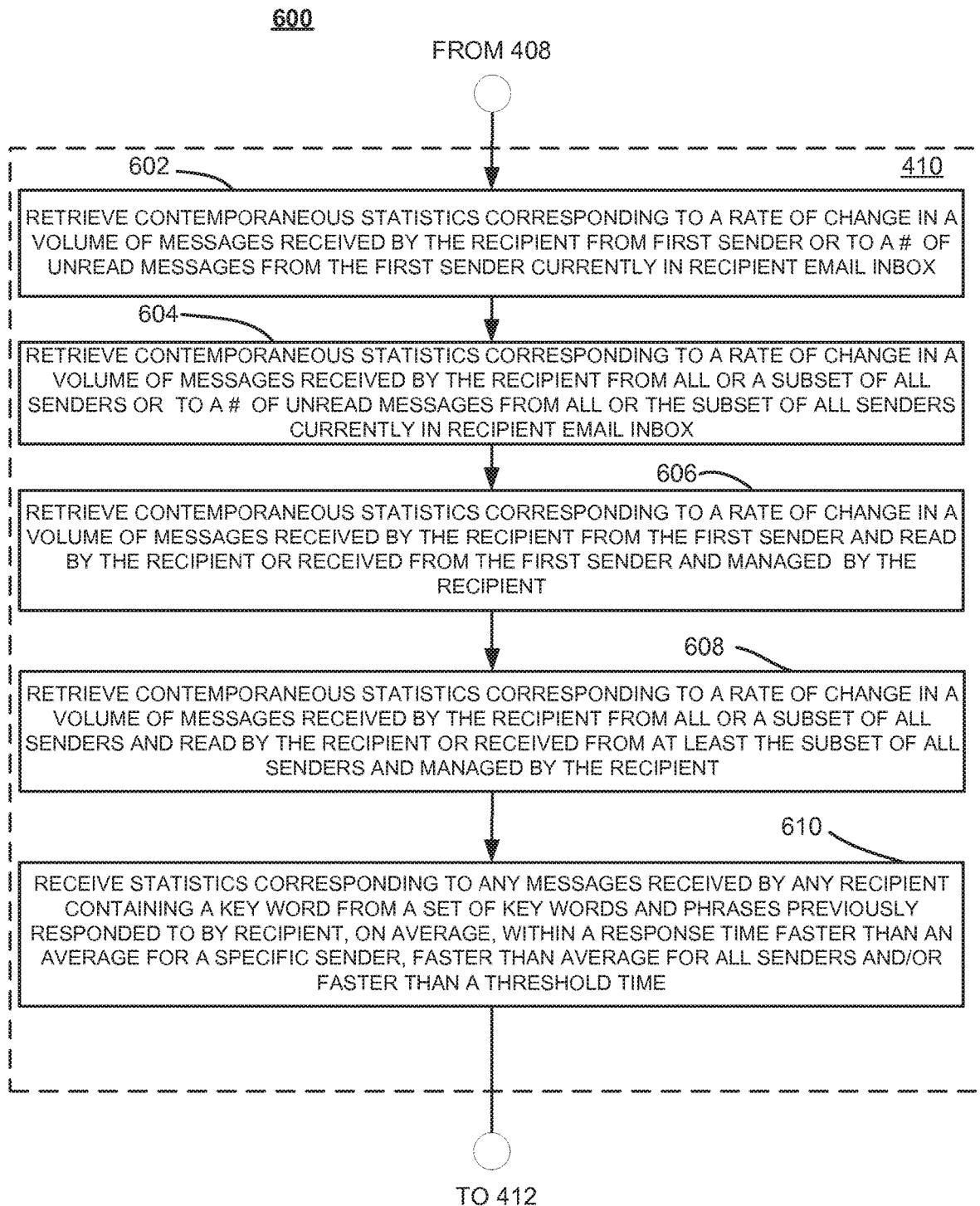
FIG. 6 is a flow diagram depicting discrete sub-steps applicable to the analysis of contemporaneous email account statistics in order to identify deviations from identified patterns, according to embodiments exemplified by FIG. 4.

FIG. 6 is a flow diagram depicting discrete sub-steps applicable to the analysis of contemporaneous email account statistics in order to identify deviations from identified patterns, according to embodiments exemplified by the method 400 of FIG. 4. The method 600 is entered at the initiation of step 410 of method 400, and at step 602, the method 600 retrieves contemporaneous statistics corresponding to a rate of change in a volume of messages received from the first sender or to a number of unread messages from the first sender currently in the recipient's email inbox. At step 604, the method retrieves contemporaneous statistics corresponding to a rate of change in a volume of messages received from all or a subset of all senders or to a number of unread messages from this plurality of senders and currently in the recipient's email inbox.

At step 606, the method 600 retrieves contemporaneous statistics corresponding to a rate of change in a volume of messages received from the first sender and read and/or managed by the recipient. At step 608, the method retrieves contemporaneous statistics corresponding to a rate of change in a volume of messages received from all or a subset of all senders and read and/or managed by the recipient. At step 610, statistics corresponding to any messages received by any recipient containing a key word from a set of key words and phrases previously responded to by the recipient, on average, within a response time faster than average time for a specific sender, faster than an average response time computed for all senders, and faster than average for senders, and/or faster than a threshold time.

Figure 7A:
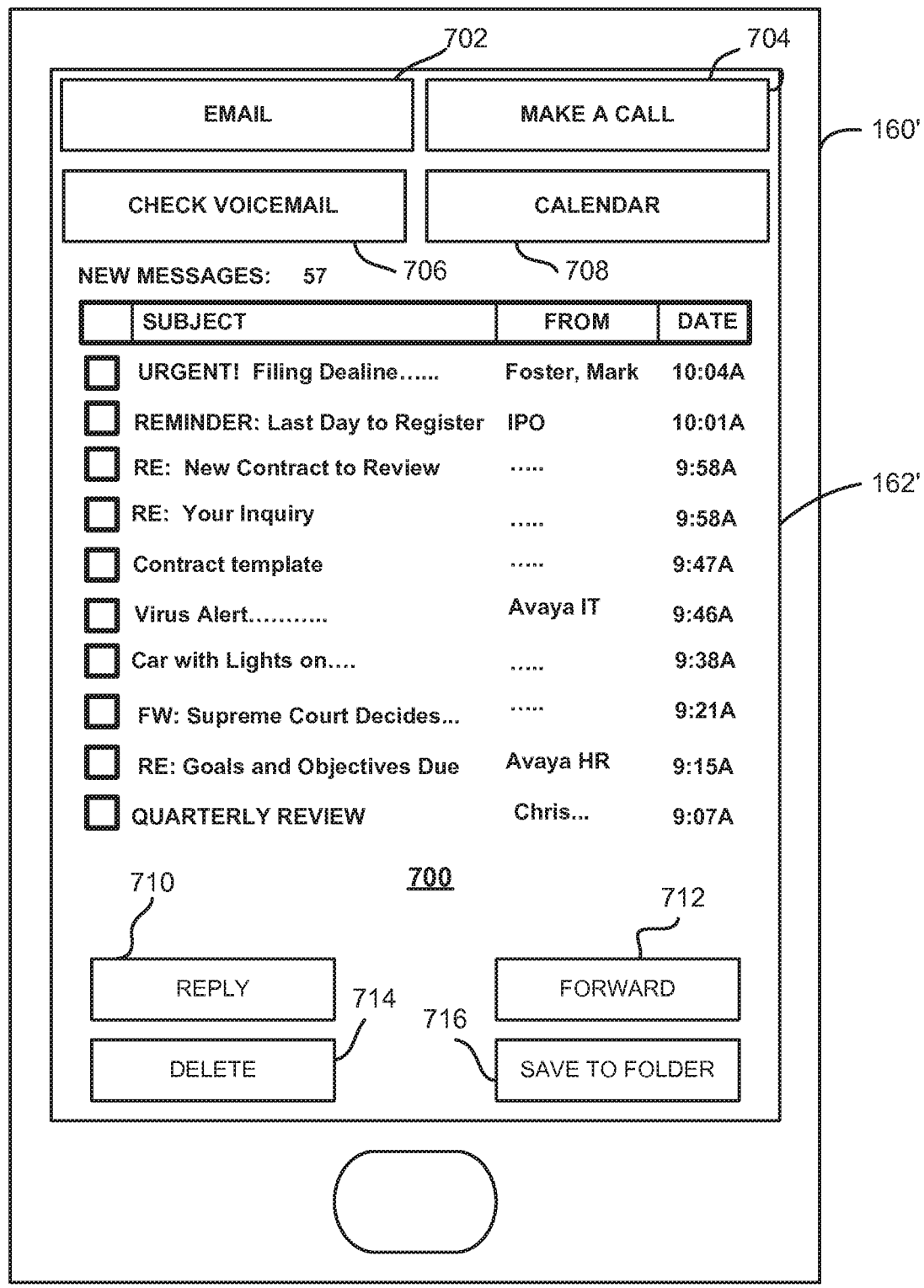
FIG. 7A is a screen shot depicting a user interface, displayed on a recipient's communication terminal, obtained by local execution of an e-mail messaging client application by a processor of the terminal and depicting an inbox managed through detection and analysis of dynamically variable behavior and activity patterns, according to one or more embodiments.

FIG. 7A is a screen shot depicting a user interface 700, displayed on a recipient's communication terminal, obtained by local execution of an e-mail messaging client application by a processor of the terminal and depicting an inbox managed through detection and analysis of dynamically variable behavior and activity patterns, according to one or more embodiments. According to some embodiments, a user of communication terminal 160' accesses an email client application or a browser application providing the interface of a hosted email application. In some embodiments, the requests are transmitted to, and the responses are returned by, a remote server having access to one or more data sources and the analytical resources needed to analyze accessible data attributes. Buttons 702-708 enable the user to navigate between individual functions of the messaging client application, and buttons 710 to 716 enable the user to reply, forward, delete and save specific messages, respectively, when using the email client application.

Figure 7B:
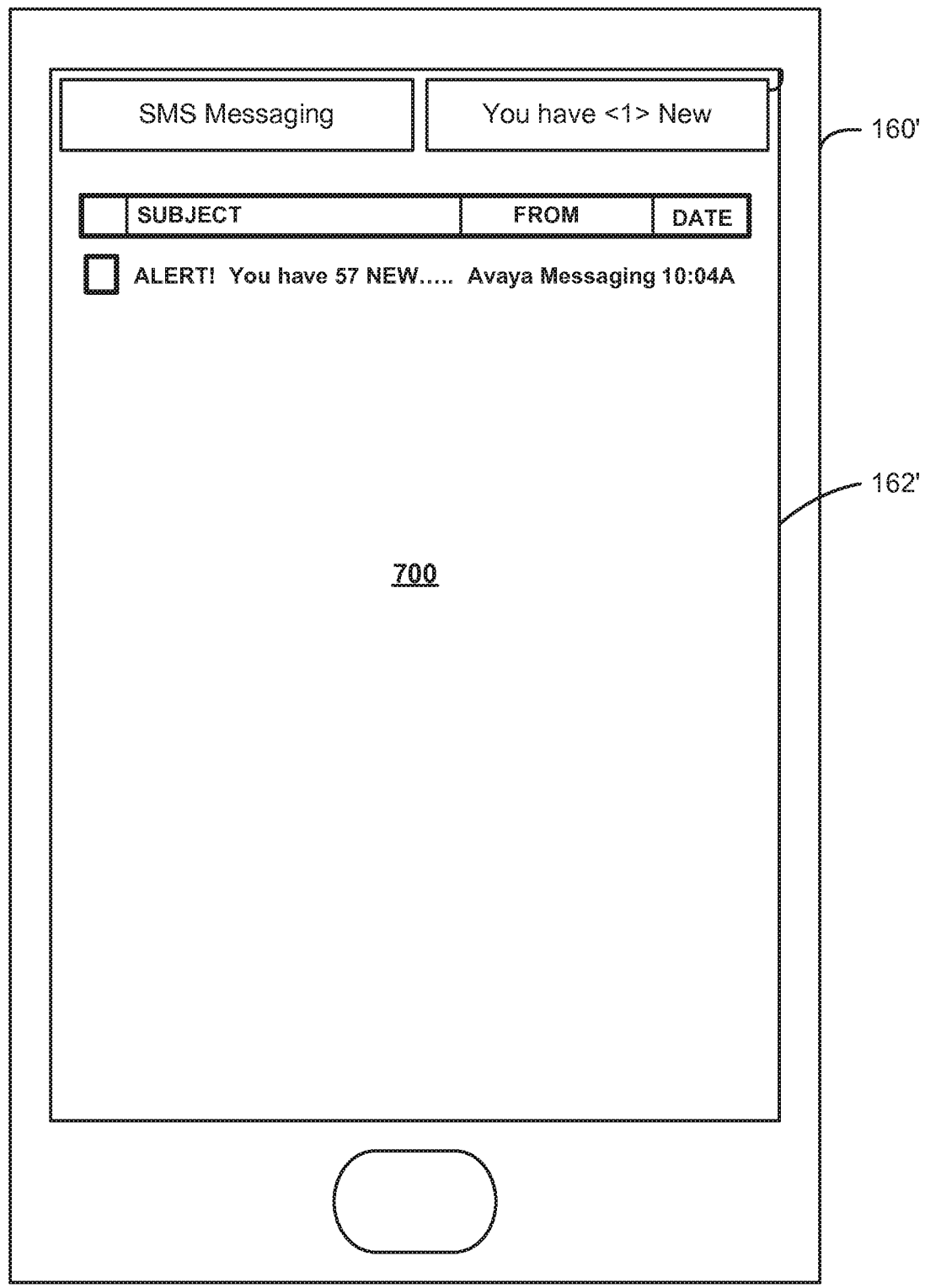
FIGS. 7B and 7C are respective screen shots depicting the display of an alert notification generated by an email message management application, and the corresponding prompt displayed to the recipient, each according to one or more embodiments.
Figure 7C:
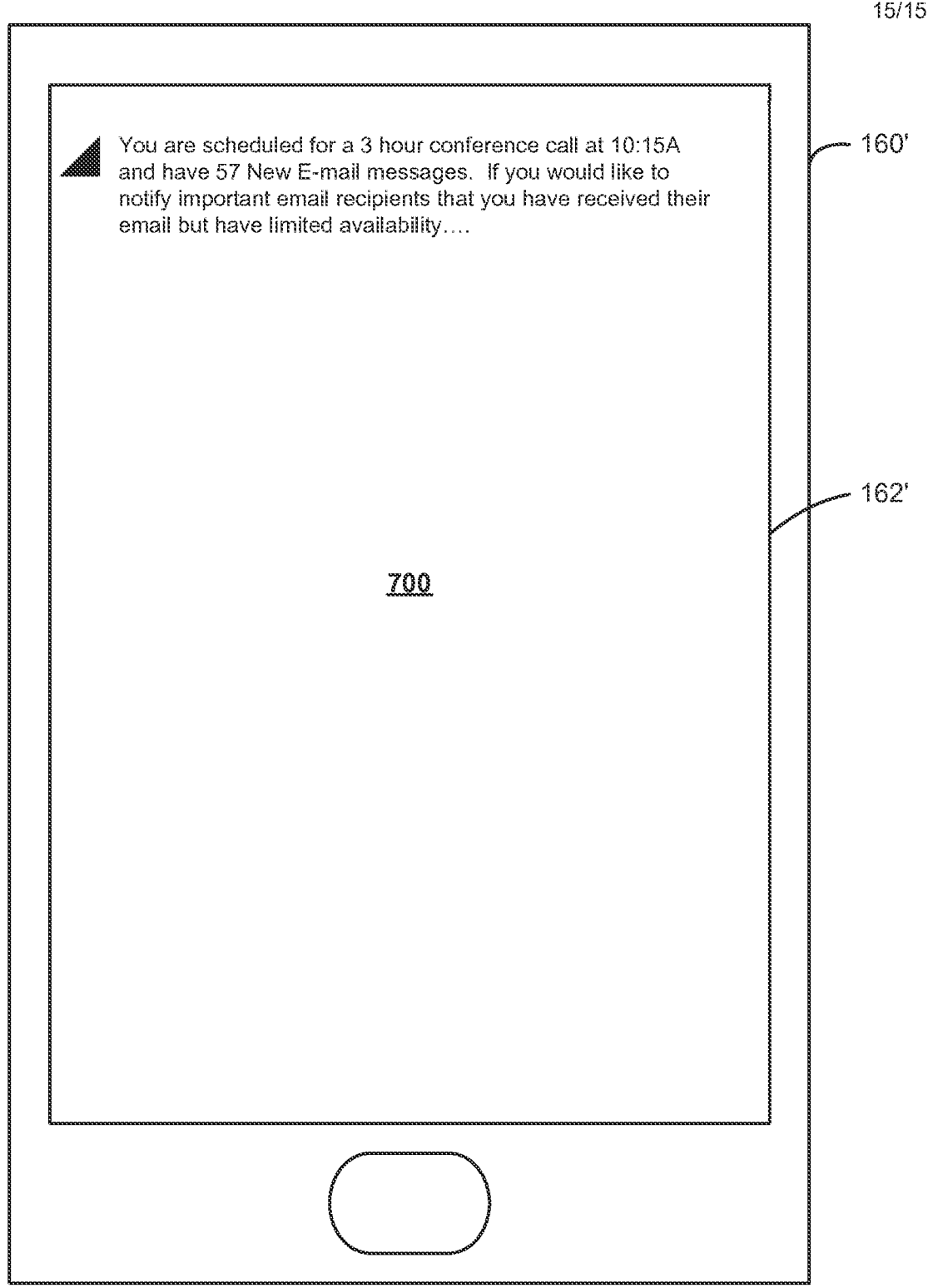

FIGS. 7B and 7C are respective screen shots depicting the display of an alert notification generated by an email message management application, and the corresponding prompt displayed to the recipient, each according to one or more embodiments.

Although the invention has largely been described and illustrated in the context of email volume management, the invention should also be understood as being directed to other types of incoming messages, including voice mails, SMS (text messages), and instant messages. The difference between the different communication modalities is the action taken, which depends on the technology that this communication modality provides. For example, for incoming voice mails the system could automatically change the outgoing voice message. For instant messaging systems, the system could change the presence indicator and text associated with the recipient, in addition to blocking incoming messages from particular senders or auto-responding to them.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
deriving statistics from messages received by a recipient from a plurality of senders;
from the statistics, identifying a frequency of sending to the recipient for each of the plurality of senders;
detecting a deviation in a first frequency of sending to the recipient for a first sender of the plurality of senders; and
upon detecting the deviation, displaying an alert notifying the recipient of the deviation in a client email application from which the recipient accesses an email account inbox and at least one of performing an action on the received message or proposing, to the recipient, a rule for treatment of email messages from the first sender.

2. The method according to claim 1, further comprising:
detecting at least one second deviation in at least one of
a contemporaneous volume or rate of change in a volume of new e-mail messages from a plurality of senders and intended for the recipient;
a contemporaneous rate of change in a volume of at least one of new messages received from the first sender and read by the recipient or email messages received from the first sender and managed by the recipient; or
a contemporaneous rate of change in a volume of at least one of new messages received from a plurality of senders and read by the recipient or email messages received from the plurality of senders and managed by the recipient.

3. The method according to claim 2, further comprising:
upon detecting the at least one second deviation, displaying an alert notifying the recipient of the at least one second deviation.

4. The method according to claim 1, wherein the statistics are included in a recipient profile for the recipient, and wherein identifying the frequency of sending to the recipient comprises:

accessing the recipient profile.

5. The method according to claim 1, wherein the deriving, identifying, and detecting are performed by a server.

6. The method according to claim 1, wherein the deriving, identifying, and detecting are performed by the client email application.

7. The method according to claim 1, wherein the deviation comprises the first frequency exceeding a threshold frequency.

8. The method according to claim 1, wherein the rule deletes all future messages from the first sender.

9. The method according to claim 1, further comprising:
upon detecting the deviation, sending an automated reply message to the first sender.

10. An apparatus comprising:
a computer having one or more processors, memory and at least one network interface, and further comprising:
a message manager module, including instructions executable by the one or more processors and configured to:
derive statistics from messages received by a recipient from a plurality of senders;
from the statistics, identify a frequency of sending to the recipient for each of the plurality of senders;
detect a deviation in a first frequency of sending to the recipient for a first sender of the plurality of senders; and
upon detecting the deviation, display an alert notifying the recipient of the deviation in a client email application from which the recipient accesses an email account inbox and at least one of perform an action on the received message or propose, to the recipient, a rule for treatment of email messages from the first sender.

11. The apparatus according to claim 10, wherein the message manager module is further configured to:
detect at least one second deviation in at least one of
a contemporaneous volume or rate of change in a volume of new e-mail messages from a plurality of senders and intended for the recipient;
a contemporaneous rate of change in a volume of at least one of new messages received from the first sender and read by the recipient or email messages received from the first sender and managed by the recipient; or
a contemporaneous rate of change in a volume of at least one of new messages received from a plurality of senders and read by the recipient or email messages received from the plurality of senders and managed by the recipient.

12. The apparatus according to claim 11, wherein the message manager module is further configured to:
upon detecting the at least one second deviation, display an alert notifying the recipient of the at least one second deviation.

13. The apparatus according to claim 10, wherein the statistics are included in a recipient profile for the recipient, and wherein the message manager configured to identify the frequency of sending to the recipient comprises the message manager configured to:
access the recipient profile.

14. The apparatus according to claim 10, wherein the deviation comprises the first frequency exceeding a threshold frequency.

15. The apparatus according to claim 10, wherein the rule deletes all future messages from the first sender.

16. The apparatus according to claim 10, wherein the message manager module is further configured to:
upon detecting the deviation, send an automated reply message to the first sender.

17. A non-transitory computer readable storage medium comprising instructions that, when executed by a processor, cause a system to:
derive statistics from messages received by a recipient from a plurality of senders;
from the statistics, identify a frequency of sending to the recipient for each of the plurality of senders;
detect a deviation in a first frequency of sending to the recipient for a first sender of the plurality of senders; and
upon detecting the deviation, display an alert notifying the recipient of the deviation in a client email application from which the recipient accesses an email account inbox and at least one of perform an action on the received message or propose, to the recipient, a rule for treatment of email messages from the first sender.

18. The non-transitory computer readable storage medium according to claim 17, wherein the deviation comprises the first frequency exceeding a threshold frequency.

19. The non-transitory computer readable storage medium according to claim 17, wherein the rule deletes all future messages from the first sender.

20. The non-transitory computer readable storage medium according to claim 17, wherein the instructions further cause the system to:
upon detecting the deviation, send an automated reply message to the first sender.

* * * * *